(12) United States Patent
Wheatley et al.

(10) Patent No.: US 11,879,779 B2
(45) Date of Patent: *Jan. 23, 2024

(54) OPTICAL DEVICE COMPRISING WAVELENGTH-SELECTIVE OPTICAL FILTER INCLUDING DOWNCONVERTER

(71) Applicant: 3M INNOVATIVE PROPERTIES COMPANY, St. Paul, MN (US)

(72) Inventors: John A. Wheatley, Stillwater, MN (US); Mark A. Roehrig, Stillwater, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 60 days.

This patent is subject to a terminal disclaimer.

(21) Appl. No.: 17/623,469

(22) PCT Filed: Jun. 23, 2020

(86) PCT No.: PCT/IB2020/055934
§ 371 (c)(1),
(2) Date: Dec. 28, 2021

(87) PCT Pub. No.: WO2021/001726
PCT Pub. Date: Jan. 7, 2021

(65) Prior Publication Data
US 2022/0357205 A1 Nov. 10, 2022

Related U.S. Application Data

(60) Provisional application No. 62/869,741, filed on Jul. 2, 2019.

(51) Int. Cl.
*G01J 3/42* (2006.01)
*G01J 3/02* (2006.01)
(Continued)

(52) U.S. Cl.
CPC . *G01J 3/42* (2013.01); *G01J 1/58* (2013.01); *G01J 3/0224* (2013.01); *G01J 3/36* (2013.01);
(Continued)

(58) Field of Classification Search
CPC .... G01J 3/42; G01J 1/58; G01J 3/0224; G01J 3/36; G01J 2003/1213; G01N 21/31;
(Continued)

(56) References Cited

U.S. PATENT DOCUMENTS 3,610,729 A 10/1971 Rogers
4,446,305 A 5/1984 Rogers
(Continued)

FOREIGN PATENT DOCUMENTS

EP 2085797 6/2016
GB 2447925 A * 10/2008 ............... G01J 3/12
(Continued)

OTHER PUBLICATIONS

International Search Report for PCT Application No. PCT/IB2020/055934, dated Aug. 25, 2020, 5 pages.

*Primary Examiner* — Michelle M Iacoletti
*Assistant Examiner* — Noah J. Haney
(74) *Attorney, Agent, or Firm* — Clifton F. Richardson

(57) ABSTRACT

An optical system (150) is disclosed and includes an optical sensor (154), a plurality of photosensitive pixels (178) disposed on the optical sensor, a wavelength-selective optical filter (158) in optical communication with the photosensitive pixels, the wavelength-selective optical filter being disposed remotely from the optical sensor, and a plurality of spatially-variant areas (220, 224, 228, 232) disposed in the optical filter, at least one area of the plurality of spatially-variant areas including a downconverter (400, 500).

15 Claims, 13 Drawing Sheets

(51) Int. Cl.
*G02B 5/20* (2006.01)
*G02B 5/22* (2006.01)
*G01J 3/36* (2006.01)
*G02B 5/28* (2006.01)
*G01J 1/58* (2006.01)
*G01N 21/31* (2006.01)
*G01J 3/12* (2006.01)

(52) U.S. Cl.
CPC ............... *G01N 21/31* (2013.01); *G02B 5/20* (2013.01); *G02B 5/201* (2013.01); *G02B 5/22* (2013.01); *G02B 5/223* (2013.01); *G02B 5/28* (2013.01); *G01J 2003/1213* (2013.01)

(58) Field of Classification Search
CPC . G02B 5/20; G02B 5/201; G02B 5/22; G02B 5/223; G02B 5/28
USPC .......................................................... 356/319
See application file for complete search history.

(56) References Cited

U.S. PATENT DOCUMENTS

| | | | |
|---|---|---|---|
| 4,540,623 A | 9/1985 | Im | |
| 5,448,404 A | 9/1995 | Schrenk | |
| 5,882,774 A | 3/1999 | Jonza | |
| 7,433,552 B2 | 10/2008 | Kiesel | |
| 8,437,582 B2* | 5/2013 | Kiesel | G01J 3/26 385/12 |
| 8,629,981 B2 | 1/2014 | Martini | |
| 9,404,797 B2* | 8/2016 | Walters | G01N 21/64 |
| 9,719,639 B2* | 8/2017 | Gu | F21K 9/60 |
| 9,810,930 B2 | 11/2017 | Merrill | |
| 10,168,460 B2* | 1/2019 | Benoit | B82Y 20/00 |
| 10,699,098 B2* | 6/2020 | Chen | G06V 40/1318 |
| 2008/0315339 A1 | 12/2008 | Rennie | |
| 2010/0097612 A1* | 4/2010 | Utsunomiya | G01N 21/554 356/445 |
| 2015/0309225 A1* | 10/2015 | Moore | A61B 1/00186 359/885 |
| 2017/0124376 A1 | 5/2017 | Wyrwas | |
| 2017/0357840 A1 | 12/2017 | Chen | |
| 2019/0025511 A1* | 1/2019 | Rothberg | G01N 21/6454 |
| 2019/0065815 A1 | 2/2019 | Park | |
| 2021/0140878 A1* | 5/2021 | Valouch | G01S 17/46 |

FOREIGN PATENT DOCUMENTS

| | | | | |
|---|---|---|---|---|
| WO | WO-2018013363 A1 * | 1/2018 | | G02B 5/0841 |
| WO | WO 2018-165180 | 9/2018 | | |
| WO | WO-2018172115 A1 * | 9/2018 | | G02B 5/202 |

* cited by examiner

OPTICAL DEVICE COMPRISING WAVELENGTH-SELECTIVE OPTICAL FILTER INCLUDING DOWNCONVERTER

BACKGROUND

Optical filters are employed in a wide variety of applications including optical communication systems, optical sensors, imaging, scientific optical equipment and display systems. Such optical filters may include optical layers that manage the transmission of incident electromagnetic radiation, including light.

Optical filters may reflect or absorb certain portions of incident light and transmit or convert other portions of incident light. Layers within an optical filter may also differ in wavelength selectivity, optical transmittance, optical clarity, optical haze and index of refraction. Systems involving optical sensors and optical filters can gather specific electromagnetic data by nature of the optical filter.

SUMMARY

In some aspects, the present disclosure provides an optical system. The optical system can include an optical sensor, a plurality of photosensitive pixels disposed on the optical sensor and a wavelength-selective optical filter in optical communication with the photosensitive pixels. The wavelength-selective optical filter can be disposed remotely from the optical sensor, and a plurality of spatially-variant areas can be disposed in the optical filter. At least one area of the plurality of spatially-variant areas can include a downconverter.

In some aspects, the present disclosure provides an optical device. The optical device can include an optical sensor, a plurality of photosensitive pixels disposed on the optical sensor and a wavelength-selective optical filter in optical communication with the photosensitive pixels. A first plurality of spatially-variant areas can be disposed in the optical filter, at least one area of the first plurality of spatially-variant areas can include a downconverter. A second plurality of spatially-variant areas can be disposed in the optical filter.

In some aspects, the present disclosure provides an optical device. The optical device can include a wavelength-selective optical filter. The filter can include a first plurality of spatially-variant areas disposed in the optical filter, at least one area of the first plurality of spatially-variant areas can include a downconverter, and a second plurality of spatially-variant areas can be included in the optical filter.

DETAILED DESCRIPTION

Figure 1:
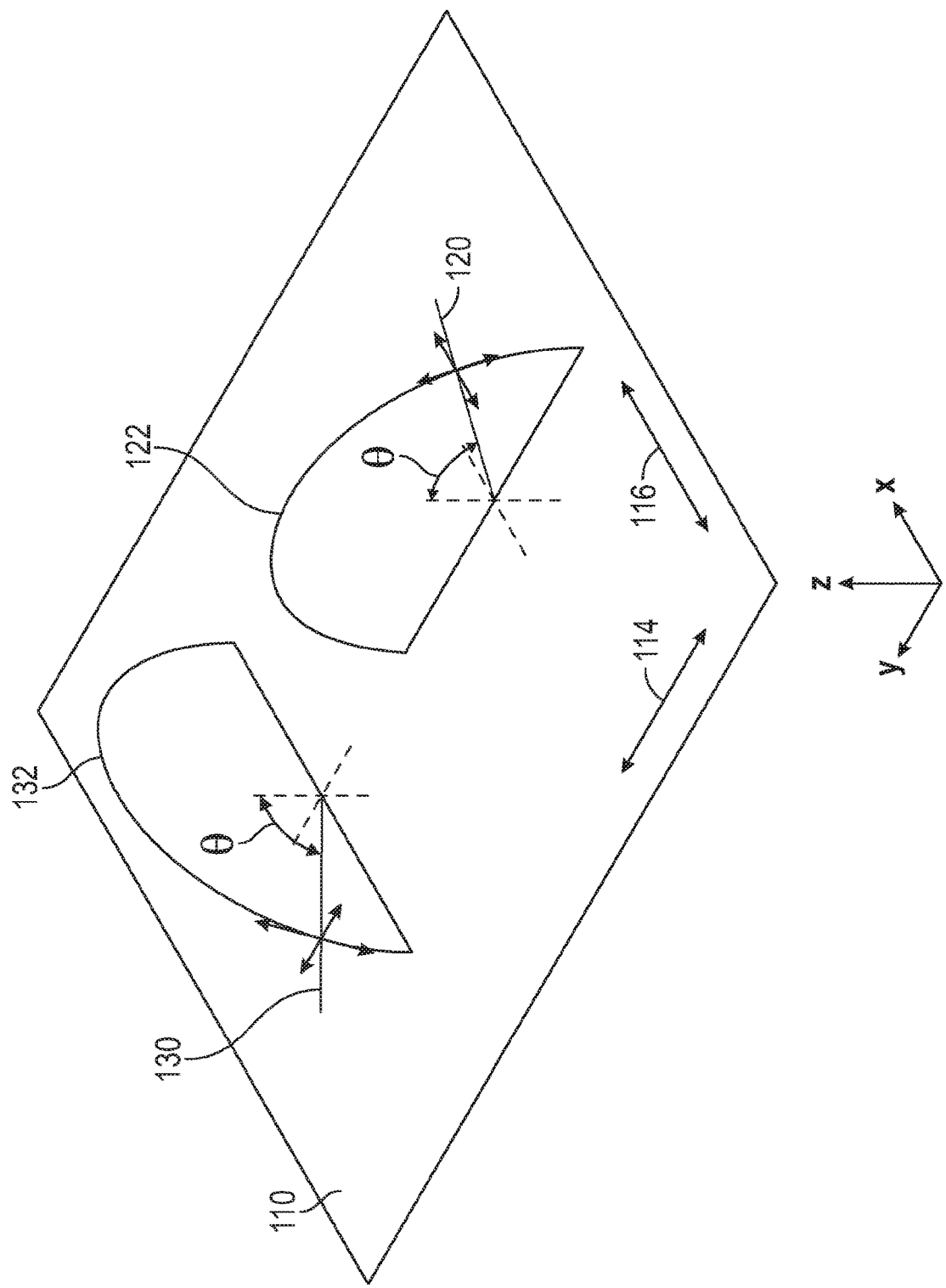
FIG. 1 is a schematic perspective view of a reflective film according to exemplary embodiments of the present disclosure.

In the following description, reference is made to the accompanying drawings that form a part hereof and in which various embodiments are shown by way of illustration. The drawings are not necessarily to scale. It is to be understood that other embodiments and embodiments are contemplated and may be made without departing from the scope or spirit of the present description. The following detailed description, therefore, is not to be taken in a limiting sense.

Multilayer optical films, i.e., films that provide desirable transmission and/or reflection properties at least partially by an arrangement of microlayers of differing refractive index, are known. Multilayer optical films have also been demonstrated by coextrusion of alternating polymer layers. See, e.g., U.S. Pat. No. 3,610,729 (Rogers), U.S. Pat. No. 4,446,305 (Rogers et al.), U.S. Pat. No. 4,540,623 (Im et al.), U.S. Pat. No. 5,448,404 (Schrenk et al.) and U.S. Pat. No. 5,882,774 (Jonza et al.). In these polymeric multilayer optical films, polymer materials are used predominantly or exclusively in the makeup of the individual layers. These may be referred to as thermoplastic multilayer optical films. Such films are compatible with high volume manufacturing processes and can be made in large sheets and roll goods.

A multilayer optical film includes individual microlayers having different refractive index characteristics such that some light is reflected at interfaces between adjacent microlayers. The microlayers are sufficiently thin so that light reflected at a plurality of the interfaces undergoes constructive or destructive interference in order to give the multilayer optical film the desired reflective or transmissive properties. For multilayer optical films designed to reflect light at ultraviolet, visible, or near-infrared wavelengths, each microlayer may have an optical thickness (a physical thickness multiplied by refractive index) of less than about 1 µm. Layers may be arranged generally as thinnest to thickest. In some embodiments, the arrangement of the alternating optical layers may vary substantially linearly as a function of layer count. These layer profiles may be referred to as linear layer profiles. Thicker layers may be included, such as skin layers at the outer surfaces of the multilayer optical film, or protective boundary layers (PBLs) disposed within the multilayer optical films, that separate coherent groupings (referred to herein as "packets") of microlayers. In some cases, the protective boundary layer may be the same material as at least one of the alternating layers of the multilayer optical film. In other cases, the protective boundary layer may be a different material, selected for its physical or rheological properties. The protective boundary layers may be on one side or on both sides of an optical packet. In the case of a single-packet multilayer optical film, the protective boundary layer may be on one or both external surfaces of the multilayer optical film.

As will be discussed below, the present disclosure provides an optical system for analyzing an optical spectrum of one or more areas. Through various elements and technologies, the optical system can be optimized to gather optical data of a measurand having a particular absorption spectrum. Non-limiting applications could include multispectral "liveness" detection for fingerprints or other biometrics, health care diagnostics including remote medicine modes, authentication of a part using spectra as an identifying feature and many other possible uses.

FIG. 1 is a schematic perspective view of a reflective film. FIG. 1 illustrates a light ray 130 that is incident on a reflective film 110 at an angle of incidence θ, thereby forming a plane of incidence 132. The reflective film 110 includes a first reflection axis 116 that is parallel to the x-axis, and a second reflection axis 114 that is parallel to the y-axis. The plane of incidence 132 of ray 130 is parallel to the first reflection axis 116. Ray 130 has a p-polarized component that is in the plane of incidence 132, and an s-polarized component that is orthogonal to the plane of incidence 132. The p-polarized light of ray 130 will be reflected by the reflective film with a reflectivity of $R_{pp-x}$ (the projection of the electric field of the p-polarized light of ray 130 onto the plane of reflective film 110 is parallel to the x-direction), while the s-polarized light of ray 130 is reflected by the reflective film with a reflectivity of $R_{ss-y}$ (the electric field of the s-polarized light of ray 130 is parallel to the y-direction).

Further, FIG. 1 illustrates ray 120 that is incident on the reflective film in a plane of incidence 122 that is parallel to the second reflection axis 114 of the film 110. Ray 120 has a p-polarized component that is in the plane of incidence 122, and an s-polarized component that is orthogonal to the plane of incidence 122. The p-polarized light of ray 120 will be reflected by the reflective film with a reflectivity of $R_{pp-y}$, while the s-polarized light of ray 120 is reflected by the reflective film with a reflectivity of $R_{ss-x}$. The amount of transmission and reflection of p- and s-polarized light, for any plane of incidence, will depend on the characteristics of reflective film.

Figure 2A:
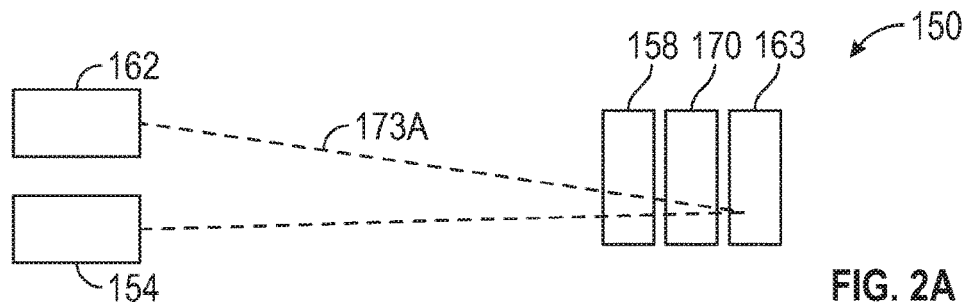
FIGS. 2A-2K are schematic illustrations of an optical system according to exemplary embodiments of the present disclosure.

FIG. 2A schematically illustrates an exemplary optical system 150. In some embodiments, the optical system 150 includes an optical sensor 154, an optical filter 158, a light source 162 and a reflector 163. A measurement subject 170 is also illustrated. In some embodiments, light emitted from the light source 162 passes through the optical filter 158 and measurement subject 170, reflects off of the reflector 163 and then passes back through the measurement subject 170 and optical filter 158 before reaching the optical sensor 154. Optical path 173A can be seen from light source 162, reflecting off the reflector 163, and then reaching the optical sensor 154.

Figure 2B:
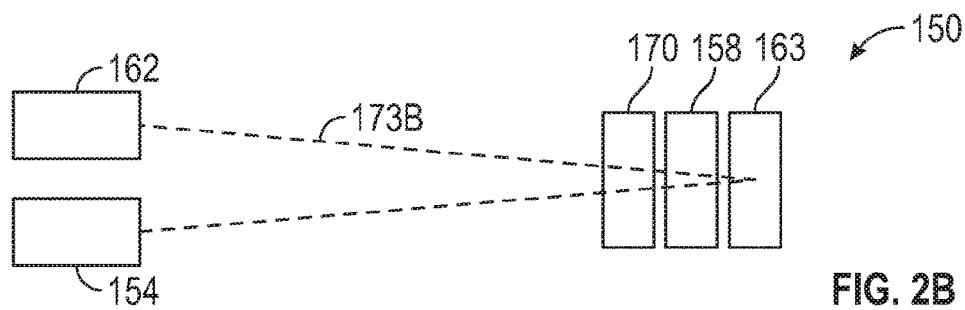

FIG. 2B schematically illustrates an exemplary optical system 150. In some embodiments, the optical system 150 includes an optical sensor 154, an optical filter 158, a light source 162 and a reflector 163. A measurement subject 170 is also illustrated. In some embodiments, light emitted from the light source 162 passes through the measurement subject 170 and optical filter 158, reflects off of the reflector 163 and then passes back through the optical filter 158 and measurement subject 170 before reaching the optical sensor 154. Optical path 173B can be seen from light source 162, reflecting off the reflector 163, and then reaching the optical sensor 154.

Figure 2C:
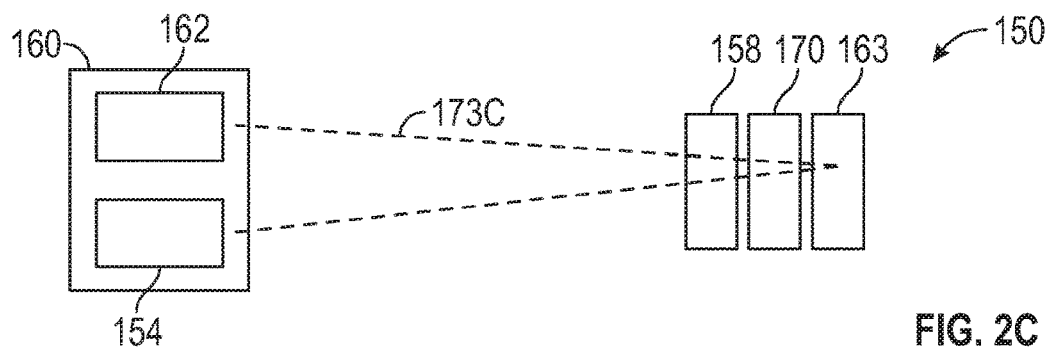

FIG. 2C schematically illustrates an exemplary optical system 150 similar to that shown in FIG. 2A. However, the optical sensor 154 and light source 162 can be included in a remote optical device 160. The remote optical device 160 can be a mobile phone, a tablet, a computer or any other medical, electrical or electromechanical device. Optical path 173C can be seen traveling from the light source 162, to the reflector and then reaching the optical sensor 154.

Figure 2D:
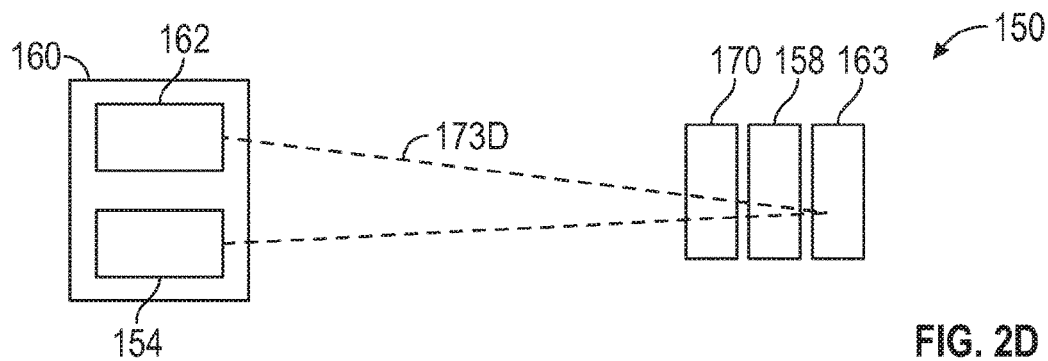

FIG. 2D schematically illustrates an exemplary optical system 150, similar to that of FIG. 2B. However, the optical sensor 154 and light source 162 can be included in the remote optical device 160. Optical path 173D can be seen travelling from the light source 162, to the reflector 163 and then reaching the optical sensor 154.

Figure 2E:

FIG. 2E schematically illustrates an exemplary optical system 150. In some embodiments, ambient light and/or light emitted from the measurement subject 170 passes through the optical filter 158 before reaching the optical sensor 154. Optical path 173E can be seen between the measurement subject 170 and the optical sensor 154.

Figure 2F:
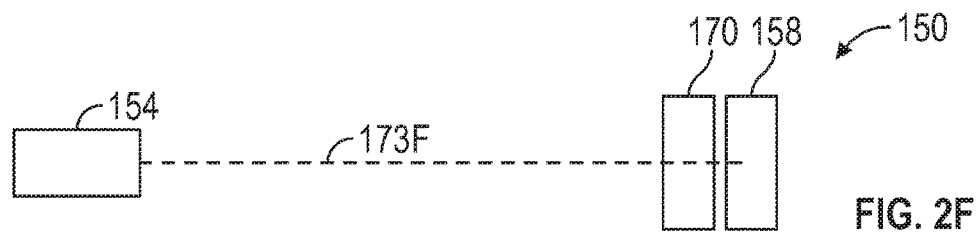

FIG. 2F schematically illustrates an exemplary optical system 150. In some embodiments, ambient light passes through the optical filter 158 before reaching the optical sensor 154. Optical path 173F can be seen between the optical filter 158 and the optical sensor 154.

Figure 2G:
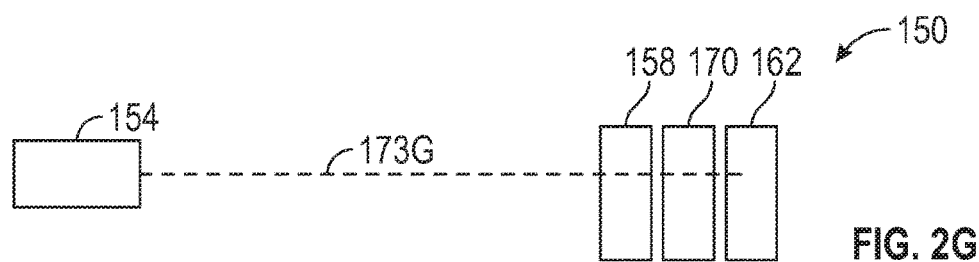

FIG. 2G schematically illustrates an exemplary optical system 150. In some embodiments, light emitted from the light source 162 and/or ambient light passes through the measurement subject 170 and the optical filter 158 before reaching the optical sensor 154. Optical path 173G can be seen between the light source 162 and the optical sensor 154.

Figure 2H:
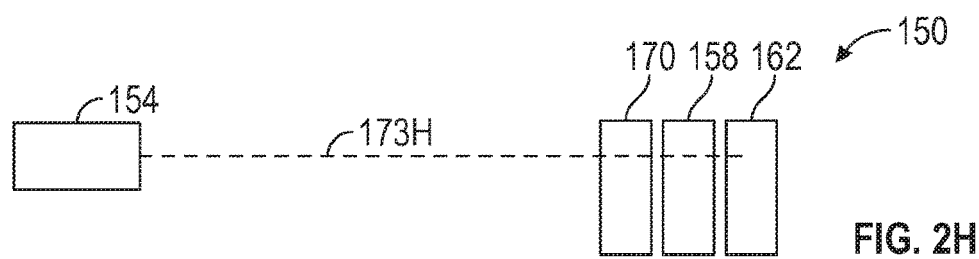

FIG. 2H schematically illustrates an exemplary optical system 150. In some embodiments, light emitted from the light source 162 and/or ambient light passes through the optical filter 158 and the measurement subject 170 before reaching the optical sensor 154. Optical path 173H can be seen between the light source 162 and the optical sensor 154.

Figure 2I:
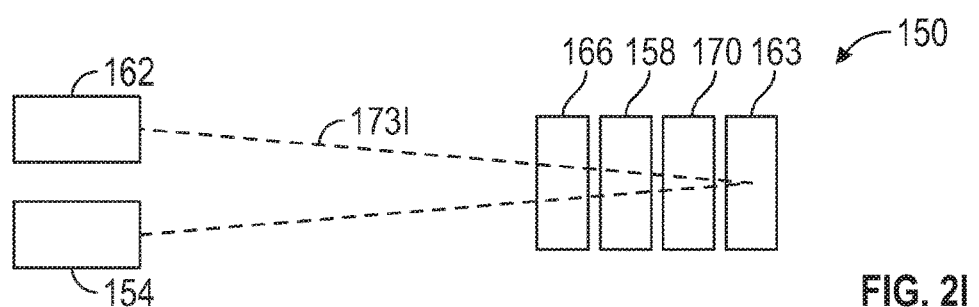

FIG. 2I schematically illustrates an exemplary optical system 150. In some embodiments, the optical system 150 includes an angle-selective filter 166. Light emitted from the light source 162 passes through elements of the optical system 150, reflects off of the reflector 163 and then passes through the measurement subject 170, optical filter 158 and angle-selective filter 166 before reaching the optical sensor 154. Optical path 173I can be seen from the light source 162, reflecting off the reflector 163 and then reaching the optical sensor 154.

Figure 2J:
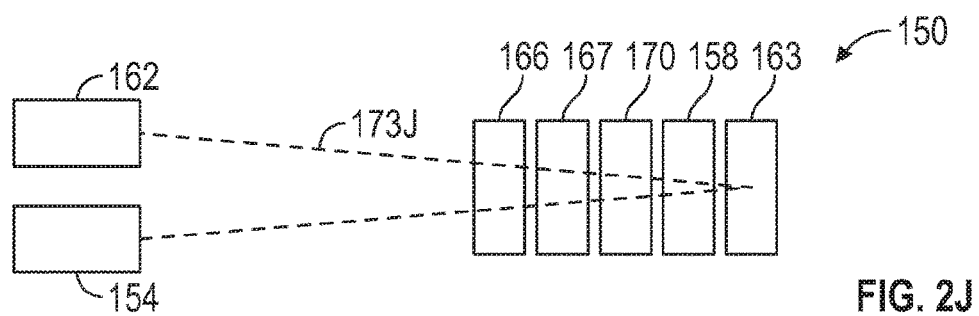

FIG. 2J schematically illustrates an exemplary optical system 150 similar to that shown in FIG. 2I. In some embodiments, the optical system 150 includes a second angle-selective filter 167 disposed along optical path 173J, as will be described below.

Figure 2K:
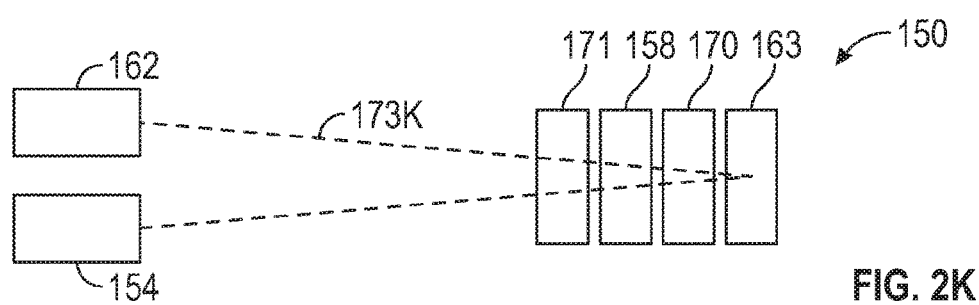

FIG. 2K schematically illustrates an exemplary optical system including a cross polarizer 171. The light source 162, in some embodiments, is a polarized light source, whereby at least some light emitted from the polarized light source reflects off of the reflector 163, along optical path 173K, such that only light, or substantially only light, reflected by the reflector 163 is detected by the optical sensor 154 due to the polarized nature of the light and the corresponding pass properties of the cross polarizer 171.

In some embodiments, the reflector 163 reflects all, substantially all or a portion of light incident on the reflector 163. In some embodiments, the reflector 163 can be a specular reflector, a semi-specular reflector, a lambertian reflector, a diffuse reflector or a retroreflector. In the case of the reflector 163 being a retroreflector, the retroreflector 163 can be one of a cube corner reflector, such as 3M Diamond Grade sheeting, or a bead-based retroreflector, such as 3M Scotchlite, or a phase-conjugate retroreflector The term "remote" can mean, in certain exemplary embodiments of this disclosure, disposed at a distance from, disposed at a minimum distance from, disposed at least 1, 5, 10, 20, 30, 40, 50, 60, 70, 80, 90, 100, 150, 200, 250, 500, 1000, 2,000 or 10,000 millimeters from, at least 1 kilometer from, apart from, not in contact with, not adjacent to and/or not integrated with. As can be seen in FIGS. 2A-2K, the optical sensor 154 can be disposed remotely from the measurement subject 170, optical filter 158, reflector 163, light source 162, angle-selective filter 166, second angle-selective filter 167 and/or cross polarizer 171. The light source 162 can be disposed remotely from the measurement subject 170, optical filter 158, reflector 163, light source 162, angle-selective filter 166, second angle-selective filter 167, optical sensor 154 and/or cross polarizer 171. The remote optical device 160 can be disposed remotely from the measurement subject 170, optical filter 158, reflector 163, light source 162, angle-selective filter 166, second angle-selective filter 167 and/or cross polarizer 171. It is to be understood that measurement subject 170 can be disposed anywhere along any disclosed optical path, and further the measurement subject 170 can be a liquid, solid or a gas.

In some embodiments, the light source 162 can include one or more of an organic light-emitting diode, an inorganic light-emitting diode, a mini light-emitting diode, a micro light-emitting diode, an incandescent filament, a light-emitting diode, a vertical cavity surface emitting laser or the optical sensor 154 itself can emit light. In some embodiments, arrays of one or more of these types of light sources can form the light source 162.

It is to be understood that the aforementioned elements of the optical system 150 can be disposed in any permutation, order or arrangement, can be in contact, not in contact, adjacent, proximate or joined while still being in optical communication, and while still falling within the scope of the disclosed optical system 150. FIGS. 2A-2K merely represent exemplary embodiments of the optical system 150. For example, the cross polarizer 171 could be included with any exemplary optical system 150 shown in FIGS. 2A-2K. Further, the angle-selective filter 166, or the angle-selective filter 166 and the second angle-selective filter 167 could be included with any exemplary optical system 150 shown in FIGS. 2A-2K.

Figure 3:
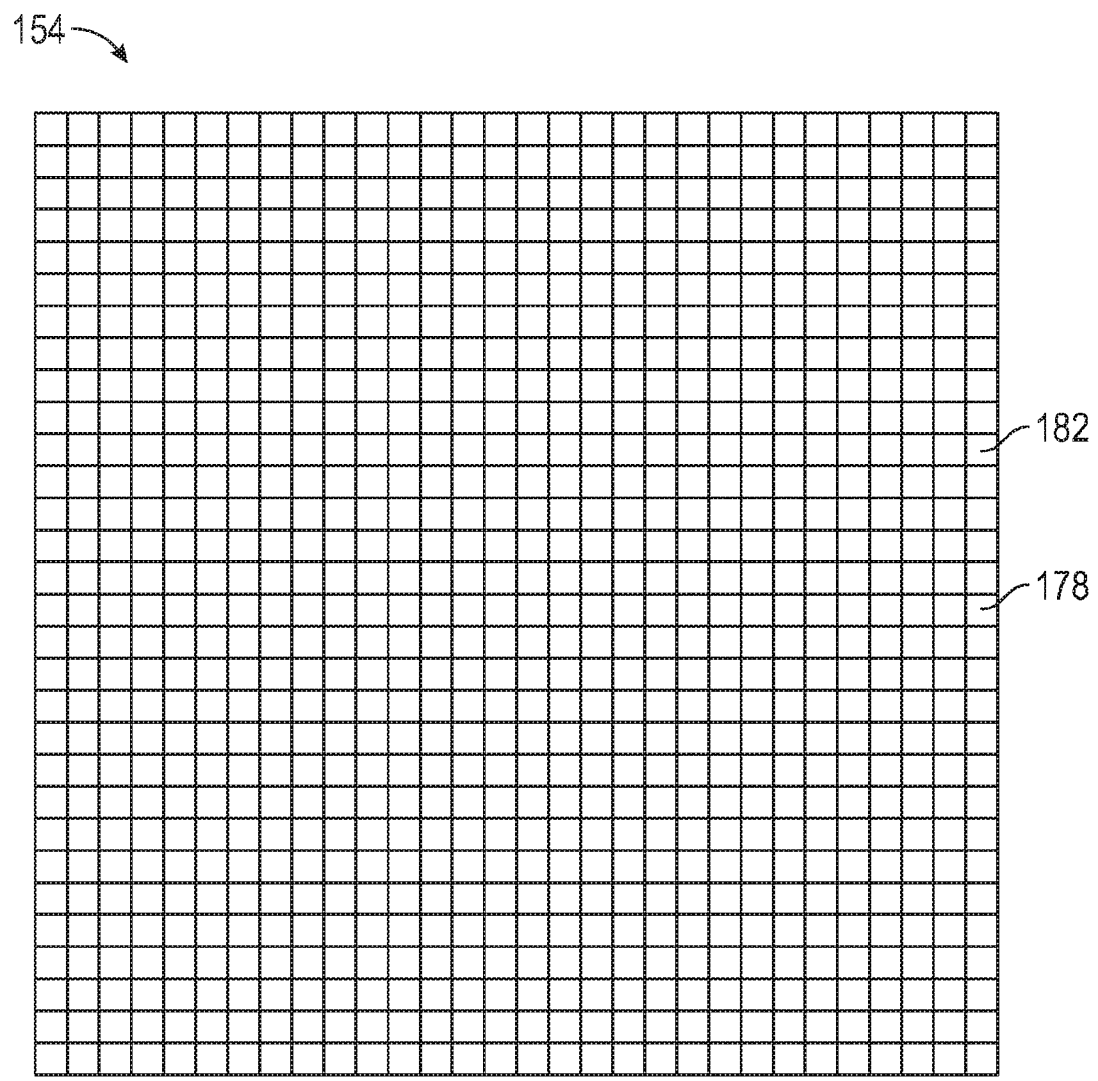
FIG. 3 is a front elevation view of an optical sensor and included pixels according to exemplary embodiments of the present disclosure.

The optical sensor 154 can sense light over a single area, or can be divided into a plurality of light-gathering photosensitive picture elements, or pixels 178. These pixels 178 can be seen in exemplary FIG. 3. One or more of the pixels 178 can serve a reference pixel 182, as will be described below in further detail. The optical sensor 154 can include a charge-coupled device, a complementary-metal-oxide semiconductor or can employ any other light-sensing sensor technology or a combination of light-sensor technologies. Additionally, the optical sensor 154 can include one or more photosensors, organic photosensors, photodiodes and/or organic photodiodes.

In some embodiments, the optical sensor 154 and/or the optical filter 158 is flexible. Such a flexible optical sensor 154 or optical filter 158 can have properties of being bendable without cracking. Such a flexible optical sensor 154 or optical filter 158 can also be capable of being formed into a roll. In some embodiments, the flexible optical sensor 154 or optical filter 158 can be bent around a roll core with a radius of curvature of, or up to, 7.6 centimeters (cm) (3 inches), 6.4 cm (2.5 inches), 5 cm (2 inches), 3.8 cm (1.5 inches), 2.5 cm (1 inch), 1.9 cm (¾ inch), 1.3 cm (½ inch) or 0.635 cm (¼ inch).

Figure 4A:
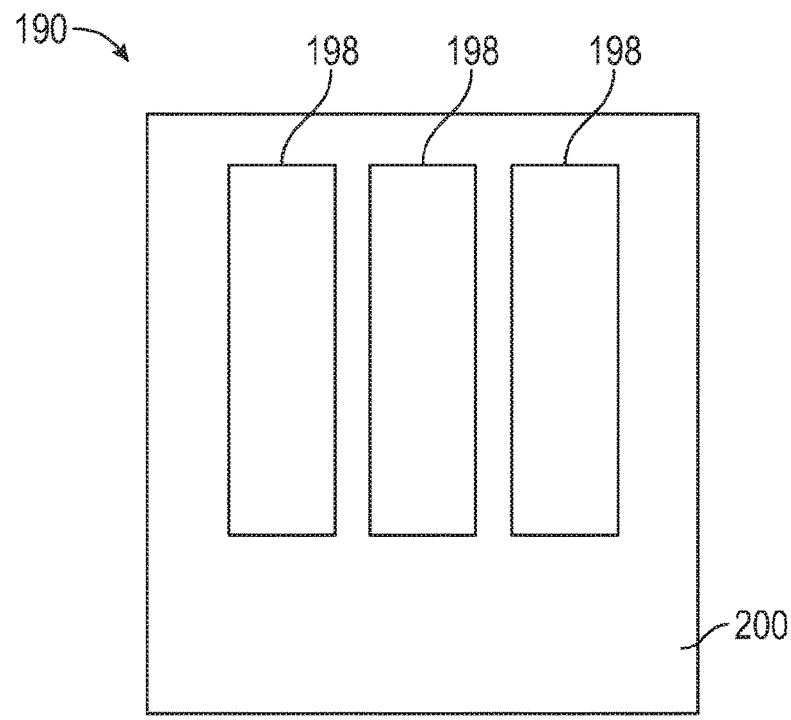
FIG. 4A is a front elevation view of a first filter sheet.
Figure 4B:
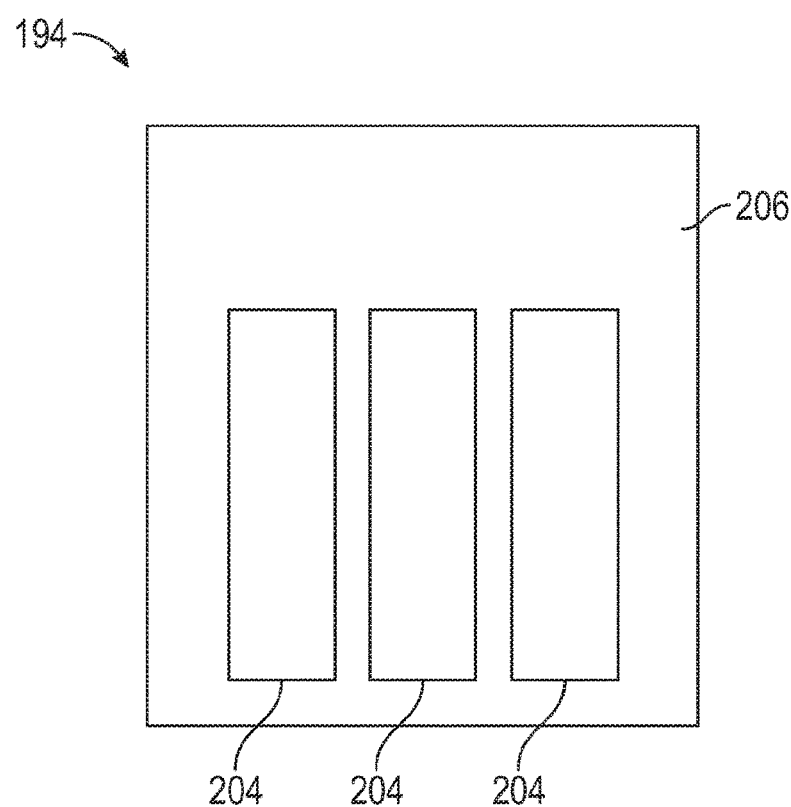
FIG. 4B is a front elevation view of a second filter sheet.

FIG. 4A shows an exemplary first filter sheet 190 and FIG. 4B shows an exemplary second filter sheet 194. The optical filter 158 can include the first filter sheet 190 and/or the second filter sheet 194. The first filter sheet 190 and second filter sheet 194 can be formed of one or more packets of optical films, as described above. One or more written regions 198 can be defined, or formed, in the first filter sheet 190. The written regions 198 can be physical apertures formed in the first filter sheet 190 through die cutting, laser ablation, heating, spatially variant coating, printing, inkjet printing, laser printing and/or water jet cutting, among other processes.

Figure 4C:
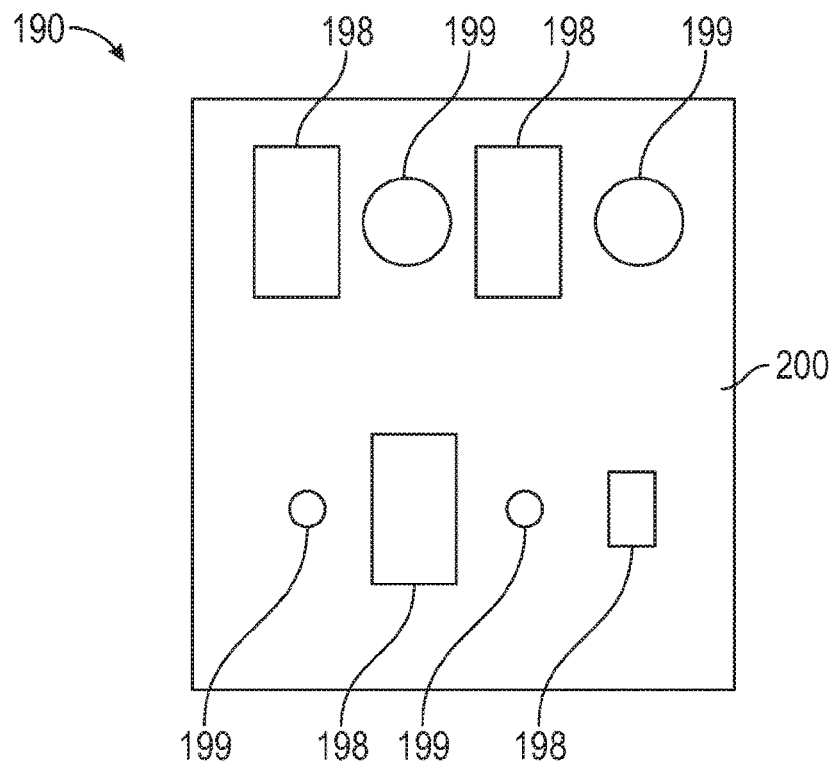
FIG. 4C is a front elevation view of another embodiment of the first filter sheet according to exemplary embodiments of the present disclosure.

Further, as shown in FIG. 4C, an exemplary embodiment of the first filter sheet 190 includes the written regions 198 along with one or more auxiliary written regions 199. The written regions 198 and auxiliary written regions 199 can be of different sizes, shapes and/or spatial patterns on the first filter sheet 190. One or more of the auxiliary written regions 199 can be larger than one or each of the pixels 178. Further, one or more of the auxiliary written regions 199 produces or defines an auxiliary transmission spectrum, which can be the same as or different from the transmission spectrum defined, or produced, by the written regions 198. It is to be understood that the written regions 198, 204 can be formed in the same manners as the auxiliary written regions 199.

In some embodiments, written regions 198, 204 and auxiliary written regions 199 include a downconverter or a downconverting material, as will be described below in further detail.

The written regions 198 can also be formed using spatially tailored optical film processes, such as those described in U.S. Pat. No. 9,810,930 (Merrill et al.), incorporated herein by reference. In particular, a laser process can locally destroy the birefringence, and thus change the optical properties and transmission spectra of written regions (such as the written regions 198). These written regions can be made completely clear, or can have a wavelength selective function (or a transmission spectrum) different from a non-written region 200 of the first filter sheet 190. One or more written regions 204 can be defined, or formed, in the second filter sheet 194 through any of the aforementioned ways that the written regions 198 are formed in the first filter sheet 190. Further, a non-written region 206 of the second filter sheet 194 is shown in FIG. 4B. Thus, the optical filter 158 can be a spatially-variant optical filter, a wavelength-selective optical filter or a spatially-variant wavelength-selective optical filter, as will be described in further detail. The written regions 198 can be of differing shapes and/or sizes within the first filter sheet 190, and the written regions 204 can be of different shapes and/or sizes within the second filter sheet 194.

The written regions 198 can be arranged in a pattern, or a repeated pattern, such that the written regions 198 are disposed in a predictable manner. Similarly, the written regions 204 can be arranged in a pattern, or a repeated pattern, such that the written regions 204 are disposed in a predictable manner. The pattern of the written regions 198 and written regions 204 may be identical, similar, dissimilar, overlapping, corresponding, partially-overlapping or unrelated when the first filter sheet 190 and second filter sheet 194 are adjacent, in contact, proximate or joined with one another. In other words, when the first filter sheet 190 and second filter sheet 194 are adjacent, in contact, proximate or joined with one another in a particular manner, the written regions 198 and written regions 204 may be overlapping, corresponding, partially-overlapping, unrelated, identical, similar or dissimilar.

Figure 5A:
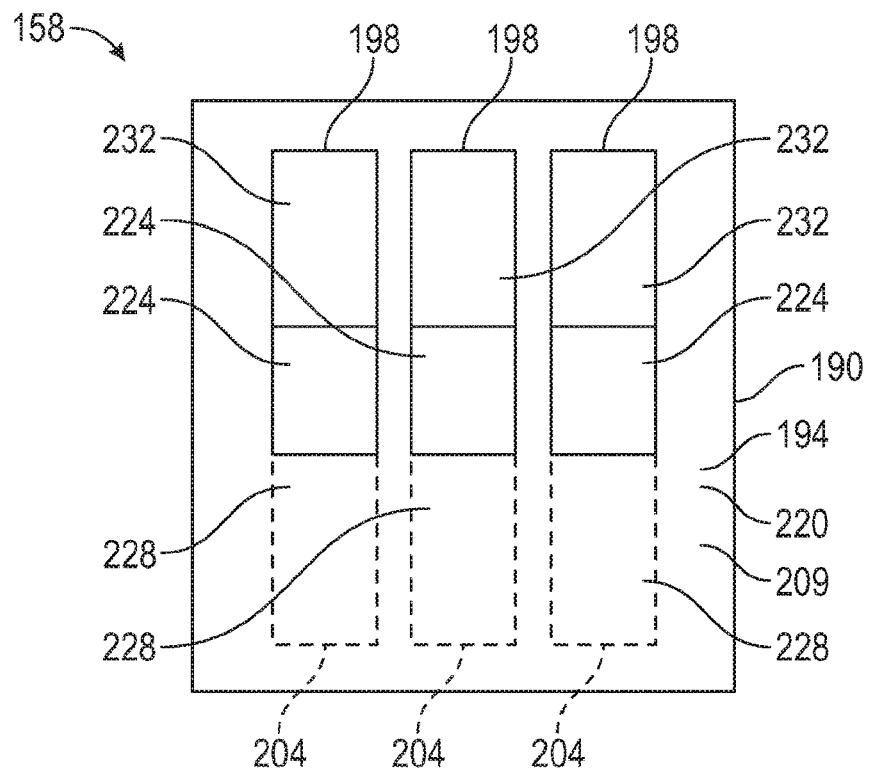
FIG. 5A is a front elevation view of the first filter sheet and second filter sheet adjacent one another and forming an optical filter.

An embodiment of the optical filter 158 is shown in FIG. 5A. In some embodiments, the optical filter 158 includes the first filter sheet 190 and the second filter sheet 194, and further the first filter sheet 190 and the second filter sheet 194 can be in contact, adjacent or proximate one another. In some embodiments, the first filter sheet 190 and second filter sheet 194 are joined, or laminated, together by one of a number of known joining technologies including weldments, adhesives and lamination, among others.

Figure 5B:
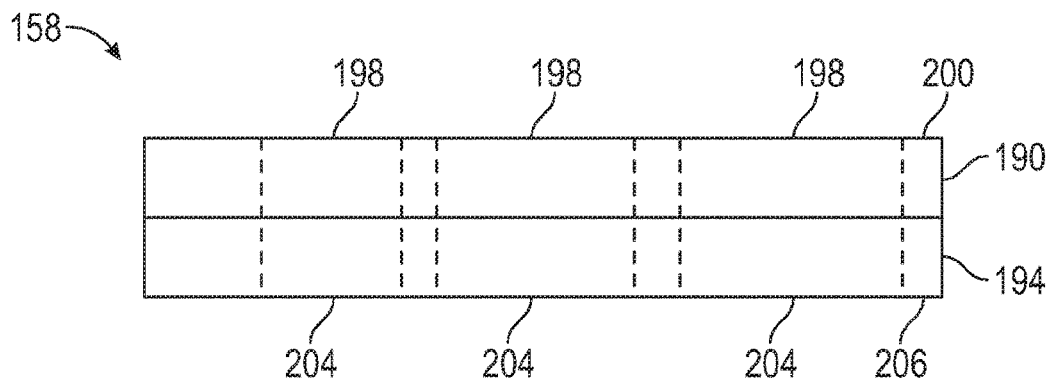
FIG. 5B is a top elevation view of the first filter sheet and second filter sheet adjacent one another and forming an optical filter and FIG. 5C is a lateral elevation view of the first filter sheet and second filter sheet adjacent one another and forming an optical filter according to exemplary embodiments of the present disclosure.
Figure 5C:
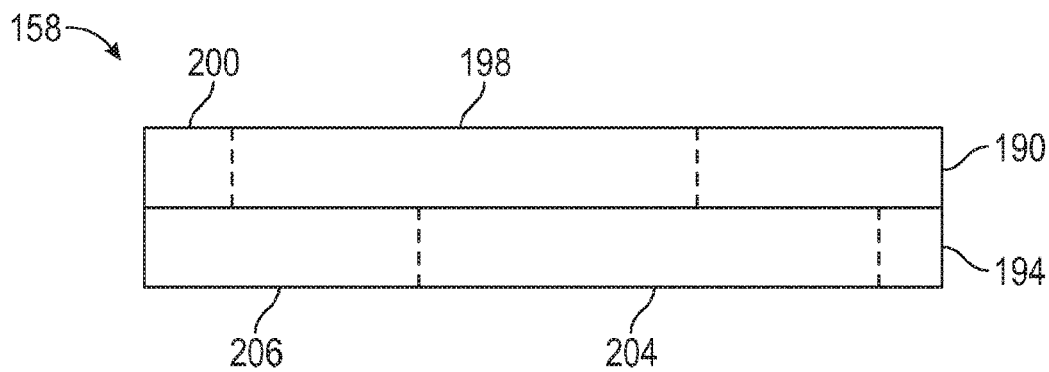
Figure 6:
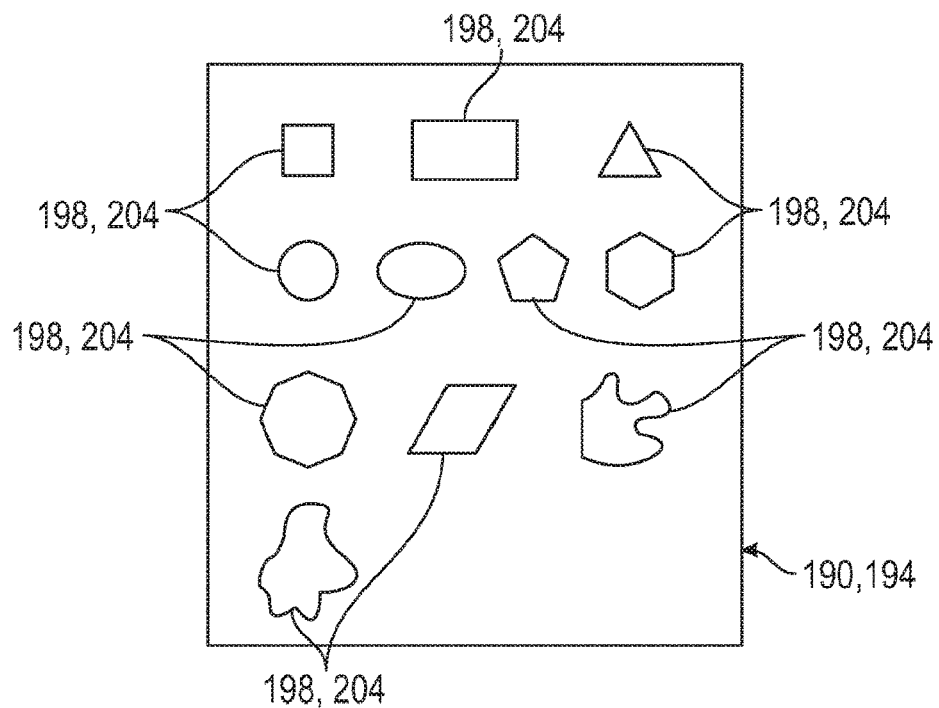
FIG. 6 is a front elevation view of an exemplary first or second filter sheet including various region shapes according to exemplary embodiments of the present disclosure.

In some embodiments, as shown in FIGS. 5A, 5B and 5C, when the first filter sheet 190 and second filter sheet 194 are adjacent, in contact, proximate or joined with one another in a particular manner, to thus form the optical filter 158, the written regions 198 and written regions 204 are partially-overlapping. In such an arrangement, rays of light incident on a front surface 209 of the optical filter 158, or to an entirety of a front surface 209 of the optical filter 158, pass through each of four different areas: a first area 220, where the incident light passes through the non-written region 200 of the first filter sheet 190 and the non-written region 206 of the second filter sheet 194, a second area 224 where the incident light passes through the written region 198 in the first filter sheet 190 and through the written region 204 in the second filter sheet 194, a third area 228 where the incident light passes through the non-written region 200 of the first filter sheet 190 and through the written region 204 in the second filter sheet 194, and a fourth area 232 where the incident light passes through the non-written region 206 of the second filter sheet 194 and through the written region 198 of the first filter sheet 190. Through such an exemplary embodiment of the optical filter 158, rays of the incident light can pass through each of the areas 220, 224, 228 and 232 to thereby be filtered in four different manners by varied influences of the first filter sheet 190 and second filter sheet 194.

In some embodiments, written regions 198, 204 and/or areas 220, 224, 228 and 232 can be of various shapes that have the same transmission spectrum. In particular, one of written regions 198, 204 and/or areas 220, 224, 228 and 232 can have a first shape and a first transmission spectrum, while another of written regions 198, 204 and/or areas 220, 224, 228 and 232 can have a second shape, different from the first shape, and a second transmission spectrum, different from the first transmission spectrum.

In some embodiments, the areas 220, 224, 228 and 232 can be independent of written regions 198, 204, and instead can simply represent geometric areas in one or more of the first filter sheet 190, second filter sheet 194 and optical filter 158, such as those geometric areas exemplarily shown by areas 220, 224, 228 and 232 in FIGS. 4A-8.

In some embodiments, written regions 198, 204 and/or areas 220, 224, 228 and 232 can include various absorptive materials, such as dyes and/or pigments. The absorptive materials could be adhered to, inserted into or formed within the first filter sheet 190, optical filter 158 and/or the second filter sheet 194, and the absorptive materials can be printed, printed using flexographic or offset techniques, coated or extruded onto the first filter sheet 190, second filter sheet 194 and/or optical filter 158.

In some embodiments, the first filter sheet 190 and second filter sheet 194 can be adhered together using an adhesive to form the optical filter 158, and the adhesive can include the absorptive material.

In some embodiments, a first absorptive material can be adhered to, inserted into, coated onto or formed within the first filter sheet 190, and may form the written regions 198, while a second absorptive material can be adhered to, inserted into or formed within the second filter sheet 194, and may form the written regions 204. The first absorptive material could have a different transmission spectrum from that of the second absorptive material. In some embodiments, the first absorptive material absorbs light with wavelengths approximately from 400-700 nm while the second absorptive material absorbs light with wavelengths approximately from 400-1000 nm. Given the differing block and pass properties of the first and second absorptive materials, and the exemplary construction of the first and second filter sheets 190, 194 to form the optical filter 158 as shown in FIG. 5A, light along an optical path can be thusly filtered to provide valuable data about the measurement subject 170 when absorbed by the optical sensor 154.

In some embodiments of the optical filter 158, one or more absorptive filters, formed from the absorptive material, could be patterned on a reflective interference filter.

In some embodiments, the written regions 198 disposed in the first filter sheet 190 and/or the written regions 204 disposed in the second filter sheet 194 can include particular shapes. For example, at least some written regions 198 disposed in the first filter sheet 190 and/or at least some written regions 204 disposed in the second filter sheet 194 can include one or more of circles, squares, triangles, ovals, rectangles, pentagons, hexagons, heptagons, octagons, organic shapes, partially-organic shapes, parallelograms, polygons and non-polygonal organic shapes. Examples of these shapes are shown, in non-limiting fashion, in FIG. 6. It is to be understood that one or more of the written regions 198 in the first filter sheet 190 and the written regions 204 in the second filter sheet 194 can form one or more of these shapes, in any order, arrangement or permutation. Further, one or more of the written regions 198 in the first filter sheet 190 and the written regions 204 in the second filter sheet 194 can be the same shape or can be different shapes.

In some embodiments, the written regions 198 in the first filter sheet 190 and/or the written regions 204 in the second filter sheet 194 can include particular sizes. Further, one or more of the written regions 198 in the first filter sheet 190 and the written regions 204 in the second filter sheet 194 can be the same size or can be different sizes. Individual sizes of the written region can vary depending on the sensing application, but can be chosen to be larger than the pixel 178 size used in the optical sensor 154 so that multiple pixels 178 are used to collect the light to increase detection power for the spectral region defined by the written region. The optical sensor pixels 178 can then be grouped by hardware or software methods to align those pixels 178 to the written region resulting in spectral-spatial mapping of the measurement layer, or measurement subject. Any one or more of the written regions 198, 204, auxiliary written regions 199 and/or areas 220, 224, 228, 232 can be larger than one pixel 178, than two pixels, 178, than five pixels 178, than ten pixels 178, than one hundred pixels 178, than one thousand pixels 178 or than any number of pixels 178 in certain embodiments.

Figure 7:
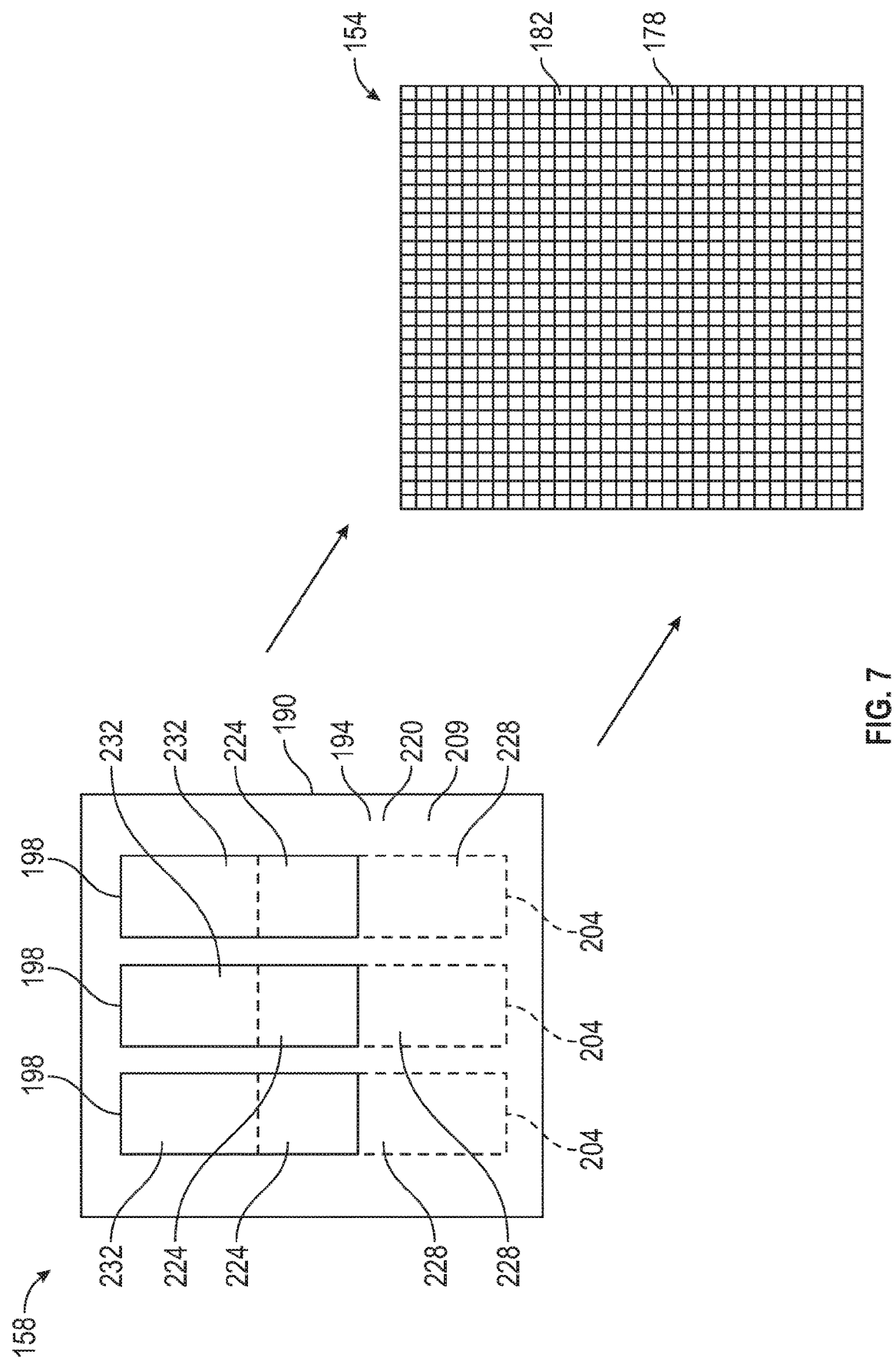
FIG. 7 illustrates a schematic view of the optical filter and the optical sensor according to exemplary embodiments of the present disclosure.
Figure 8:
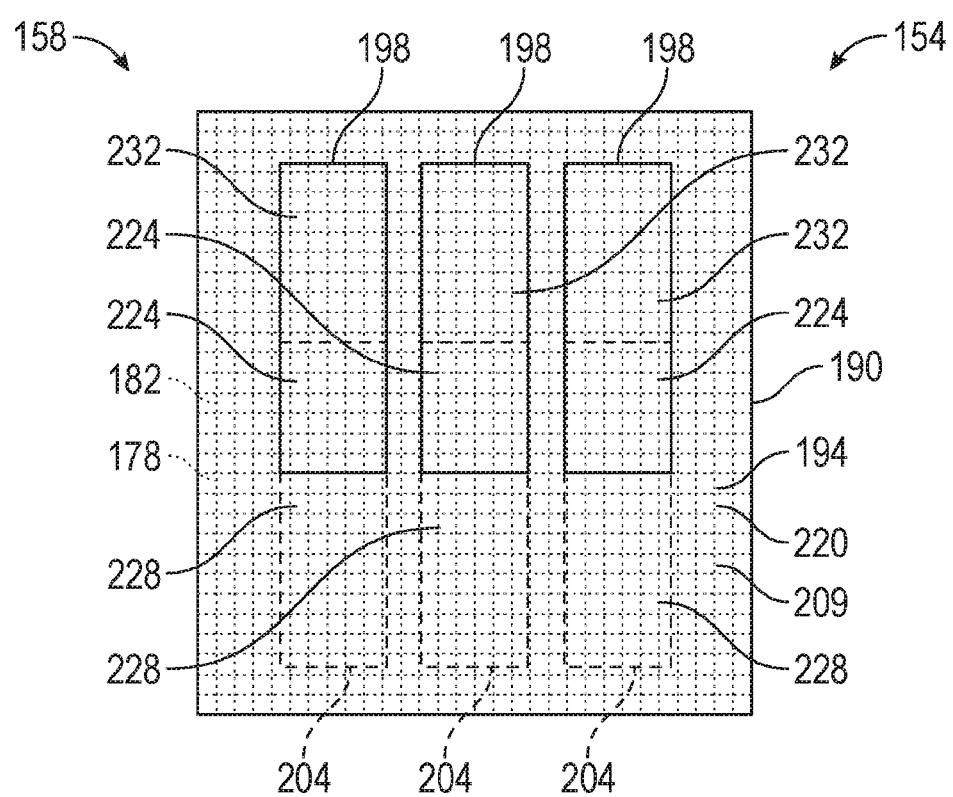
FIG. 8 illustrates the optical filter proximate the optical sensor, further showing relative positions of regions, areas and pixels, according to exemplary embodiments of the present disclosure.

As shown in FIG. 7, the optical filter 158 may be in optical communication with the optical sensor 154. In other words, light incident on the optical filter 158 may pass through one or more areas (220, 224, 228, 232) of the optical filter 158 and then reach the optical sensor 154. The optical filter 158 may be adjacent, in contact with, joined with, proximate or distal to the optical sensor 154 while still residing in optical communication with the optical sensor 154. FIG. 7 illustrates the optical filter 158 and the optical sensor 154, whereby the optical sensor is brought proximate, or adjacent, the optical sensor 154. FIG. 8 illustrates a possible relationship between the optical filter 158 and the optical sensor 154, where the optical sensor 154 is proximate, adjacent or in contact with the optical filter 158.

It can be seen in FIGS. 7 and 8 that, in some embodiments, at least some of the pixels 178 are smaller than the written regions 198 in the first filter sheet 190, the written regions 204 in the second filter sheet 194, the first area 220, the second area 224, the third area 228 and/or the fourth area 232. Further, in some embodiments, each of the pixels 178 is smaller than the written regions 198 in the first filter sheet 190, the written regions 204 in the second filter sheet 194, the first area 220, the second area 224, the third area 228 and/or the fourth area 232. At least one pixel 178 can be in optical communication with one of the written regions 198, written regions 204, first area 220, second area 224, third area 228 and fourth area 232, depending on the makeup of the optical filter 158, such that light incident on the optical system 150 and influenced by an aforementioned portion of the optical filter 158 is registered to, and recorded by, at least one pixel 178. Additionally, as described earlier, the presence of other elements (such as the light source 162 or angle-selective filter 166) does not preclude the optical filter 158 from being in optical communication with the optical sensor 154, even if the optical filter 158 is not adjacent, in contact with or proximate the optical sensor 154.

Each portion of the first filter sheet 190, second filter sheet 194 and optical filter 158 defines, or produces, a transmission spectrum or transmission spectra. It is to be understood that such a transmission spectrum or spectra defines a wavelength range of light which is transmitted, substantially transmitted, 90% transmitted, substantially 90% transmitted or partially transmitted. Similarly, light having a wavelength outside of the transmission spectrum or spectra is blocked, substantially blocked or partially blocked. In some embodiments, a visible spectrum is defined as 400 nm-700 nm, or approximately 400 nm-700 nm, a near-infrared spectrum is defined as 700 nm-2000 nm, or approximately 700 nm-2000 nm, and a near-ultraviolet spectrum is defined as 350 nm-400 nm, or approximately 350 nm-400 nm.

In some embodiments, the transmission spectrum of the non-written region 200 of the first filter sheet 190 is, or includes, approximately the visible spectrum, approximately the near-ultraviolet spectrum and/or approximately the near-infrared spectrum. In some embodiments, the transmission spectrum of the non-written region 206 of the second filter sheet 194 is, or includes, approximately the visible spectrum, approximately the near-ultraviolet spectrum and/or approximately the near-infrared spectrum.

In some embodiments, the transmission spectrum of the written region 198 of the first filter sheet 190 is, or includes, approximately the visible spectrum, approximately the near-ultraviolet spectrum and/or approximately the near-infrared spectrum. In some embodiments, the transmission spectrum of the auxiliary written region 199 of the first filter sheet 190 is, or includes, approximately the visible spectrum, approximately the near-ultraviolet spectrum and/or approximately the near-infrared spectrum. In some embodiments, the transmission spectrum of the written region 204 of the second filter sheet 194 is, or includes, approximately the visible spectrum, approximately the near-ultraviolet spectrum and/ or approximately the near-infrared spectrum.

In some embodiments, the transmission spectrum of the first area 220 is, or includes, approximately the visible spectrum, approximately the near-ultraviolet spectrum and/ or approximately the near-infrared spectrum. In some embodiments, the transmission spectrum of the second area 224 is, or includes, approximately the visible spectrum, approximately the near-ultraviolet spectrum and/or approximately the near-infrared spectrum. In some embodiments, the transmission spectrum of the third area 228 is, or includes, approximately the visible spectrum, approximately the near-ultraviolet spectrum and/or approximately the near-infrared spectrum. In some embodiments, the transmission spectrum of the fourth area 232 is, or includes, approximately the visible spectrum, approximately the near-ultraviolet spectrum and/or approximately the near-infrared spectrum.

In some embodiments, the transmission spectrum of one or more of the first, second, third or fourth areas (220, 224, 228, 232) is, substantially is, substantially includes or includes, the same transmission spectrum as one or more of any of the others of the first, second, third or fourth areas (220, 224, 228, 232). In some embodiments, the transmission spectrum of one or more of the first, second, third or fourth areas (220, 224, 228, 232) is distinct, substantially distinct, substantially partially distinct or partially distinct, from the transmission spectrum of one or more of the others of the first, second, third or fourth areas (220, 224, 228, 232).

In some embodiments, the optical filter 158 (which can be a wavelength-selective optical filter) includes a first plurality of areas, or of spatially-variant areas, which can be one or more of the first, second, third or fourth areas (220, 224, 228, 232) and a second plurality of areas, or of spatially-variant areas, which can be one or more of the first, second, third or fourth areas (220, 224, 228, 232). The areas of the first plurality of areas, or of spatially-variant areas, can have a transmission spectrum different from that of the areas of the second plurality of areas, or of spatially-variant areas.

Further, the optical sensor 154 may be active in a particular wavelength range. In other words, the optical sensor 154 may absorb and electronically register incident light, optimally absorb and electronically register incident light or partially absorb and electronically register incident light in the visible spectrum, the near-ultraviolet spectrum and/or the near-infrared spectrum.

As described, one or more of the pixels 178 may be, or serve as, the reference pixel 182. The reference pixel 182 can be used to reference one or more wavelengths to a lookup table of known thresholds or values. Such a reference pixel 182 can be used to calibrate the optical system 150 and to ensure measurement conditions remain acceptable before, during and/or after a measurement is performed.

In some embodiments, the optical system 150 includes the angle-selective filter 166. The angle-selective filter 166 limits an angle of light transmission through the angle-selective filter 166 such that light rays greater than a certain incident angle, greater than an approximate incident angle, less than a certain incident angle, less than an approximate incident angle, greater than a first incident angle and less than a second incident angle and greater than an approximate first incident angle and less than a second approximate incident angle are blocked, substantially blocked or partially blocked from transmitting through the angle-selective filter 166.

Further, in some embodiments, the angle-selective filter 166 and/or second angle-selective filter 167 can include refractive structures or louvers. The angle-selective filter 166 can improve wavelength resolution over gradual transitions that are typical of absorptive solutions.

In some embodiments, the optical system 150, optical filter 158 and/or angle-selective filter 166 defines, produces or includes a spectrally sharp transition. In contrast to a common reflective film having moderately sloped band edges, which can cause reflections or passing outside of a desired wavelength range, a spectrally sharp transition provides a more sudden change in a percentage of light blocked or reflected to reduce or eliminate light reflections or passing outside of a desired wavelength range. In some embodiments, such a spectrally sharp transition occurs in less than, or less than about, 75 nm, 50 nm, 40 nm, 30 nm, 20 nm or 10 nm. In some embodiments, a spectrally sharp transition includes, or includes about, a 70%, 75%, 80%, 85%, 90%, 95% or 99% change in transmission. In some embodiments, a spectrally sharp transition occurs in less than, or less than about, 75 nm, 50 nm, 40 nm, 30 nm, 20 nm or 10 nm and includes, or includes about, a 70%, 75%, 80%, 85%, 90%, 95% or 99% change in transmission.

In some embodiments, the optical filter 158 is birefringent, meaning that refractive indices for light traveling along at least two of three principal and perpendicular directions (x, y and z axes) of the optical filter 158, are not equal. Further, the refractive indices for light traveling along three principal and perpendicular directions (x, y and z axes) may not be equal in certain embodiments.

In some embodiments, the optical system 150 includes a polarizer, which can be any portion of the first filter sheet 190 and second filter sheet 194 or a distinct element. Such a polarizer can be a circular polarizer, a linear polarizer, a reflective polarizer or any other type of polarizer commonly known to one skilled in the art. The polarizer allows light of certain polarizations to pass while blocking others. In some embodiments, the optical system 150 includes a retarder. The retarder functions to alter a polarization state of light passing therethrough. Through the polarization properties of the polarizer and polarization alteration properties of the retarder, along with the small size of pixels 178 relative to the written regions 198, 204 and areas 220, 224, 228, 232, optical data sensed by the optical sensor 154 can be refined to thereby increase a signal-to-noise ratio of the optical system and/or to achieve a particular polarization to best suit the absorptive properties of the optical sensor 154.

Further, the optical system can include a plurality of polarizers. In some embodiments, the light source can include a polarizer. In some embodiments, the optical system can include a second polarizer. In some embodiments, the light source includes a polarizer while the optical system 150 includes another polarizer. In some embodiments, the polarizer included with the light source and/or the polarizer included with the optical system 150 are wavelength selective.

In some embodiments, the polarizer included with the light source and/or the polarizer included with the optical system 150 is a linear polarizer. In some embodiments, the polarizer included with the light source and/or the polarizer included with the optical system 150 is a circular polarizer. In some embodiments, the polarizer included with the light source and the polarizer included with the optical system 150 are linear polarizers and each of the polarizers are arranged in parallel, or that the polarization axes of the polarizers are arranged in parallel or substantially in parallel. In some embodiments, the polarizer included with the light source and the polarizer included with the optical system 150 are linear polarizers and each of the polarizers are arranged orthogonal to one another, or that the polarization axes of the polarizers are arranged orthogonal to one another or substantially orthogonal to one another.

In some embodiments, the polarizer included with the light source and the polarizer included with the optical system 150 are circular polarizers and each of the polarizers are arranged in parallel, or that the polarization axes of the polarizers are arranged in parallel or substantially in parallel. In some embodiments, the polarizer included with the light source and the polarizer included with the optical system 150 are circular polarizers and each of the polarizers are arranged orthogonal to one another, or that the polarization axes of the polarizers are arranged orthogonal to one another or substantially orthogonal to one another.

In some embodiments, the light source 162 has, defines and/or produces an emission spectrum of light. In some embodiments, the emission spectrum of the light source 162 is wider than a transmission spectrum of one or more of the areas 220, 224, 228, 232, written regions 198, 204, non-written regions 200, 206 and/or auxiliary written regions 199. In some embodiments, the light source 162 includes one or more narrow emission peaks, which can be defined as 80 nm full width at half maximum.

In some embodiments, the optical system 150 includes a measurement taken via ambient light and/or light from the light source 162 as described above and passing through the optical filter 158 before reaching the optical sensor 154. In some embodiments, multiple measurements could be taken at different times. In some embodiments, multiple measurements could be taken where the optical sensor 154 is disposed at different incident angles, distances and/or orientations relative to one or more of the optical filter 158, measurement subject 170 and reflector 163. In some embodiments, the optical filter 158 and/or the measurement subject 170 can be measured at different incident angles, which could prove valuable as different angular measurements could yield varied data collected by the optical sensor 154 due to the angular relationship between a disclosed optical path, the optical filer 158 and the first and/or second angle-selective filters 166, 167. In some embodiments, the multiple measurements could be taken by the optical sensor 154 at different times, while in some embodiments the multiple measurements could be taken by the optical sensor 154 and a second optical sensor.

The measurement subject could be animate or inanimate. In some embodiments, the measurement subject 170 can be a person, animal, plant, living tissue or other animate object. In some embodiments, the measurement subject could be a film, an electronic display, non-living plant or animal tissue or any other inanimate object.

In some embodiments, the optical filter 158 can be curved, spherically-curved, cylindrically-curved, planar, flat or have any other curved shape. Similarly, in some embodiment, the optical sensor 154 can be curved, spherically-curved, cylindrically-curved, planar, flat or have any other curved shape. In some embodiments, the optical filter 158 and optical sensor 154 can have the same or different types of curvature.

Figure 9A:
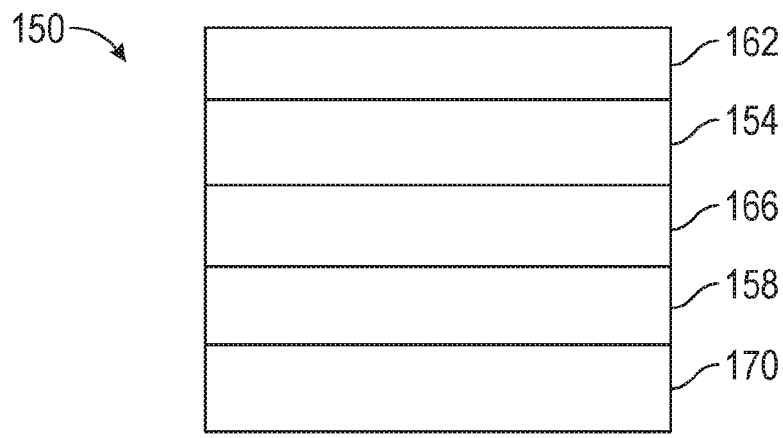
FIGS. 9A-9F are schematic illustrations of an optical device according to exemplary embodiments of the present disclosure.

FIG. 9A schematically illustrates an exemplary optical device 150. In some embodiments, the optical device 150 includes the optical sensor 154, the optical filter 158 and the angle-selective filter 166. A measurement subject 170 and a light source 162 are also illustrated. In this embodiment, light emitted from the light source 162 passes through all elements of the optical device 150, reflects off of the measurement subject 170 and then passes through the optical filter 158 and angle-selective filter 166 before reaching the optical sensor 154.

Figure 9B:
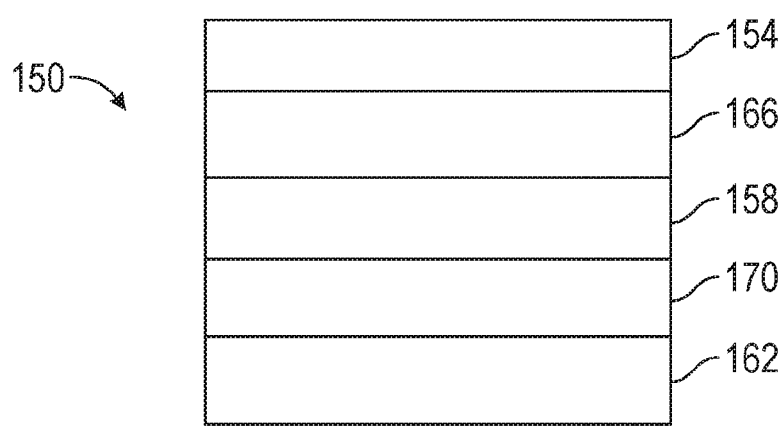

FIG. 9B illustrates another exemplary optical device 150, showing the optical sensor 154, optical filter 158, angle-selective filter 166, light source 162 and measurement subject 170 in a different configuration from that shown in FIG. 9A. In this embodiment, light from the light source 162 passes through the measurement subject 170 en route to the remaining elements of the optical device 150.

Figure 9C:
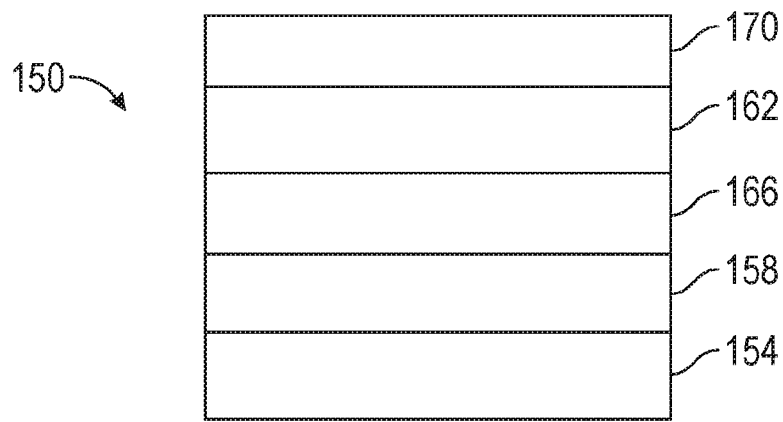

FIG. 9C illustrates another exemplary optical device 150, showing the optical sensor 154, optical filter 158, angle-selective filter 166, light source 162 and measurement subject 170 in a different configuration from that shown in FIG. 9A and FIG. 9B. The light source 162 in this embodiment is a transmissive light source, whereby at least some light emitted from the transmissive light source can reflect off of a portion of the measurement subject 170 and then pass through the transmissive light source and toward the remaining elements of the optical device 150.

Figure 9D:
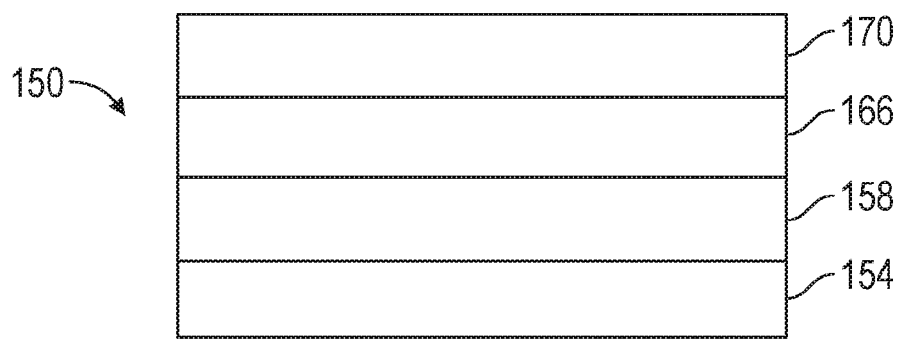

FIG. 9D illustrates another exemplary optical device 150, showing the optical sensor 154, optical filter 158, angle-selective filter 166, light source 162 and measurement subject 170 in a different configuration from that shown in FIG. 9A, FIG. 9B or FIG. 9C. This embodiment does not include a light source, and light from other sources (such as ambient light) reflects off of the detectable subject before passing through elements of the optical device 150 and reaching the optical sensor 154.

Figure 9E:
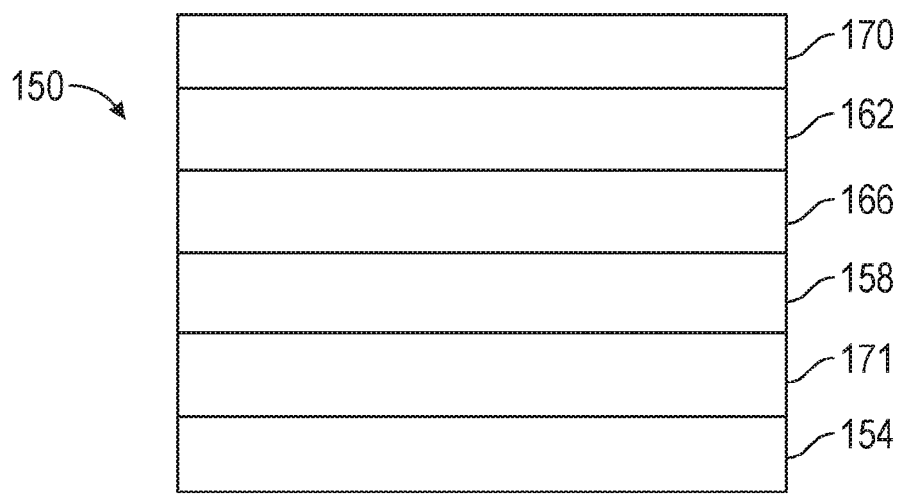

FIG. 9E illustrates another exemplary optical device 150, showing the optical sensor 154, optical filter 158, angle-selective filter 166, light source 162 and measurement subject 170 in a different configuration from that shown in FIG. 9A, FIG. 9B, FIG. 9C or FIG. 9D. The light source 162 in this embodiment is a polarized transmissive light source, whereby at least some light emitted from the polarized transmissive light source can reflect off of a portion of the measurement subject 170 and then pass through the polarized transmissive light source and pass through a cross polarizer 171 such that only light, or substantially only light, reflected from the measurement subject 170 is detected by the optical sensor 154.

Figure 9F:
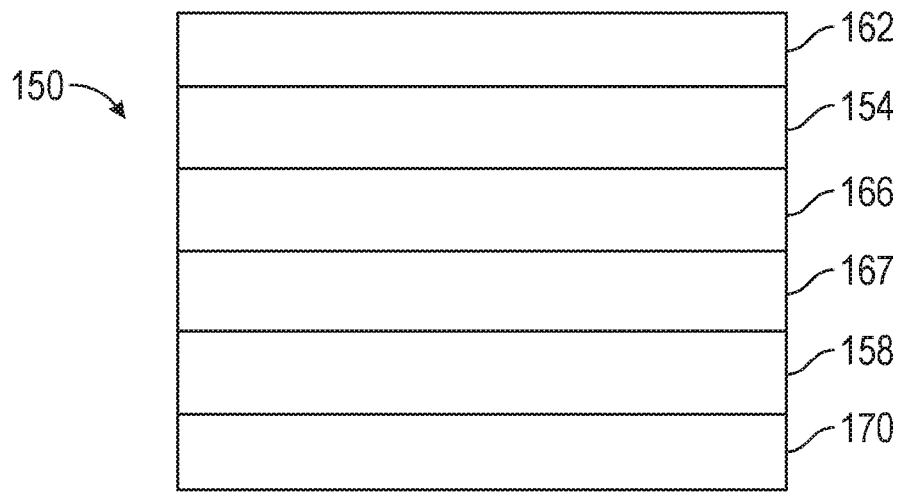

FIG. 9F illustrates another exemplary embodiment of optical device 150. In this embodiment, light from the light source 162 passes through the measurement subject 170 en route to the remaining elements of the optical device 150, which include a second angle-selective filter 167 to be described below in greater detail.

Figure 10:
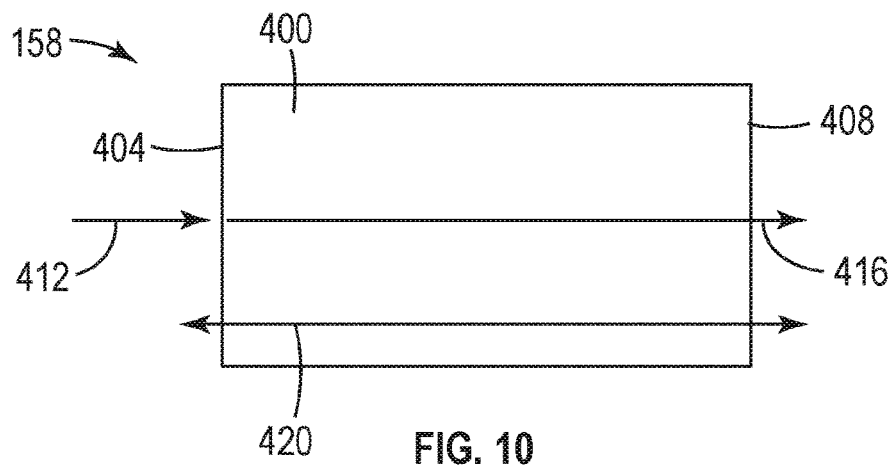
FIG. 10 is a view of an optical filter including a downconverter, according to exemplary embodiments of the present disclosure.

FIG. 10 illustrates an exemplary cross section of the optical filter 158. In some embodiments, the optical filter 158 includes a downconverter 400, or a down-converting material. The downconverter 400 can absorb light, at a first wavelength or first wavelength range, and downconvert the light to a second wavelength or second wavelength range. The second wavelength can be longer than the first wavelength and at least some wavelengths of the second wavelength range can be longer than at least some wavelengths of the first wavelength range. In some non-limiting examples, the first wavelength range can be 325-660 nm, which can include the first wavelength, and the second wavelength range can be 380-760 nm, which can include the second wavelength. Further, the downconverter 400, 500 can absorb light at a relatively short wavelength (such as the first wavelength or first wavelength range) and emit light at a longer wavelength (such as the second wavelength or second wavelength range).

At least a portion of input light 412 entering the downconverter 400 via the input side 404 can be downconverted to a longer wavelength, or wavelength range, thus becoming downconverted output light 420. The downconverted output light 420 can then exit the downconverter 400 via the output side 408 and/or the input side 404. Some input light 412 entering the downconverter 400 via the input side 404 can also pass through the downconverter 400 without being downconverted, thus becoming output light 416 that can exit the downconverter 400 via the output side 408.

Figure 11:
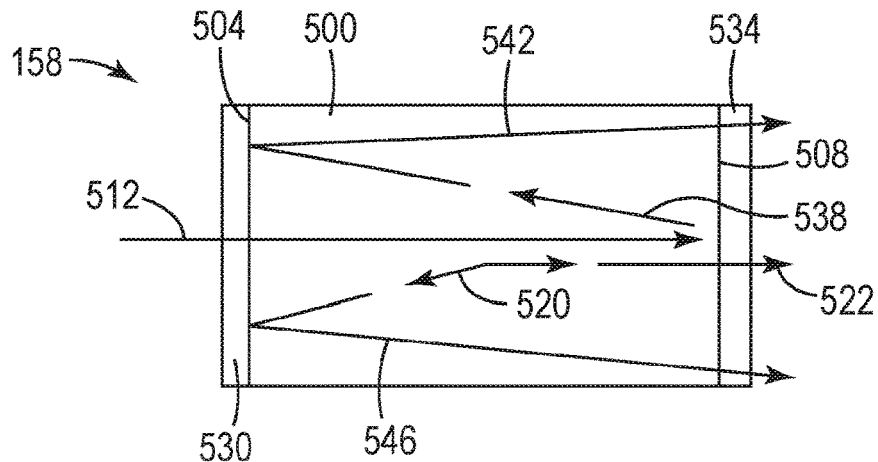
FIG. 11 is a view of an optical filter including a downconverter, different from that shown in FIG. 10, according to exemplary embodiments of the present disclosure.

In some embodiments, as shown in FIG. 11, a downconverter 500 is similar to the downconverter 400 shown in FIG. 10. The downconverter 500 can absorb light, at the first wavelength or first wavelength range, and downconvert the light to the second wavelength or second wavelength range. The second wavelength can be longer than the first wavelength and at least some wavelengths of the second wavelength range can be longer than at least some wavelengths of the first wavelength range. In some non-limiting examples, the first wavelength range can be 325-660 nm, which can include the first wavelength, and the second wavelength range can be 380-760 nm, which can include the second wavelength.

In some embodiments, the downconverter 500 includes a low-pass filter 530 in optical communication with the input side 504 and a high-pass filter 534 in optical communication with the output side 508. The low-pass filter 530 can be adjacent, proximate or in contact with the input side 504 and the high-pass filter 534 can be adjacent, proximate or in contact with the output side 508. Each of the low-pass filter 530 and high-pass filter 534 can include multi-layer optical film. The low-pass filter 530 can permit the passage of the first wavelength or at least a portion of the first wavelength range while reflecting the second wavelength or at least a portion of the second wavelength range. The high-pass filter 534 can permit the passage of the second wavelength or at least a portion of the second wavelength range while reflecting the first wavelength or at least a portion of the first wavelength range.

In operation, at least a portion of input light 512 entering the downconverter 500 via the input side 500 and the low-pass filter 530 can be downconverted to a longer wavelength, or wavelength range, thus becoming downconverted light 520. A portion of the downconverted light 520 can then exit the downconverter 500 via the output side 508 through the high-pass filter 534 as downconverted output light 522. However, another portion of the downconverted light 520 can travel towards the low-pass filter 530, reflect off the low-pass filter 530 and then exit the downconverter 500 via the output side 508 through the high-pass filter 534. The low-pass filter 530 can reflect all or only a portion of the downconverted light that is incident on it.

Further, a portion of the input light 512 not downconverted can reflect off of the high-pass filter 534, as reflected input light 538, and subsequently can become downconverted in the downconverter 500 to downconverted reflected input light 542. This downconverted reflected input light 542 can then reflect off of the low-pass filter 530 before exiting the downconverter 500 via the output side 508 and passing through the high-pass filter 534. The downconverter 400, 500 can include fluorescent, phosphorescent materials and chemistries, and can include dyes, pigments or quantum dots.

It is to be understood that downconverters 400, 500, as exemplified in FIGS. 10 and 11, can be included in one or more of the optical filter 158, first filter sheet 190, second filter sheet 194, an adhesive (for example as used to join the first and second filter sheets 190, 194 or used elsewhere in the optical filter 158, remote optical device 160 or optical system 150), written regions 198, auxiliary written regions 199, non-written region 200, first areas 220, second areas 224, third areas 228 and/or fourth areas 232. Additionally, portions of the optical filter 158 outside of a portion of the optical filter 158 including a downconverter 400, 500 can be devoid of a downconverter 400, 500.

In various embodiments, the input side 404, 504 or the low-pass filter 530 can define the front surface 209 of the optical filter 158. In various embodiments, the output side 408, 508 or the high-pass filter 534 can define a rear surface of the optical filter 158, which can be substantially opposed to the front surface 209.

The optical filter 158 can also include a reference area 457. The reference area 457, which can form all or a portion of the first filter sheet 190, second filter sheet 194 or one or more written regions 198, auxiliary written regions 199, non-written regions 200, first areas 220, second areas 224, third areas 228 and fourth areas 232. The reference area 457, which can include a downconverter 400, 500, can be calibrated to a known transmission band, downconverting performance or other optical property to enable a comparison between any portion of the optical filter 158 outside of the reference area 457 and the reference area 457, and to calibrate the optical filter 158 or other measurement parameter.

Figure 12:
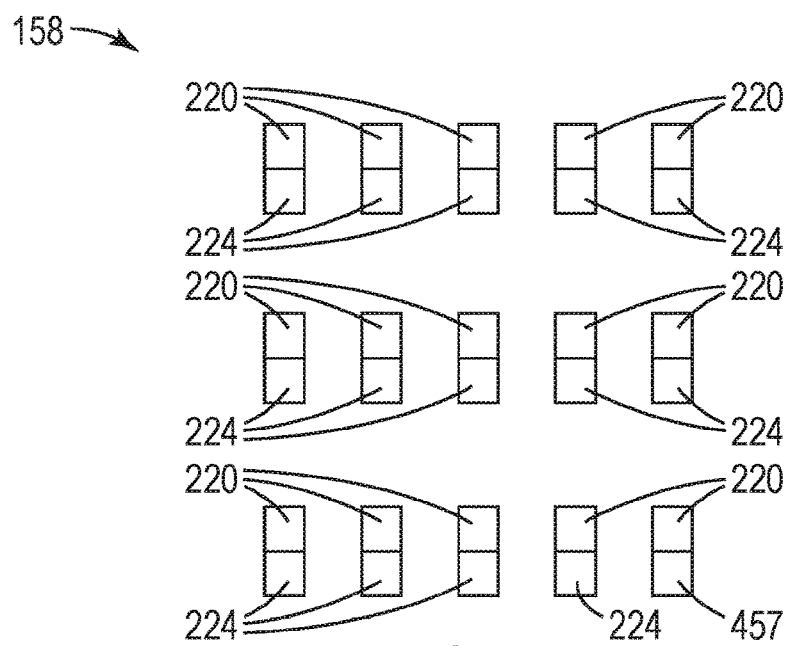
FIG. 12 illustrates a spatially-variant optical filter according to exemplary embodiments of the present disclosure.

In some embodiments, as best shown in FIG. 12, the optical filter 158 can include a plurality of discrete elements. For example, the optical filter 158 can include a plurality of first areas 220 and a plurality of second areas 224 arranged in a spatially-variant pattern, an example of which is shown in FIG. 12. It is to be understood that any permutation and/or arrangement of spatially-variant written regions 198, auxiliary written regions 199 first areas 220, second areas 224, third areas 228 and fourth areas 232 as a plurality of discrete elements is within the scope of this disclosure.

Figure 13:
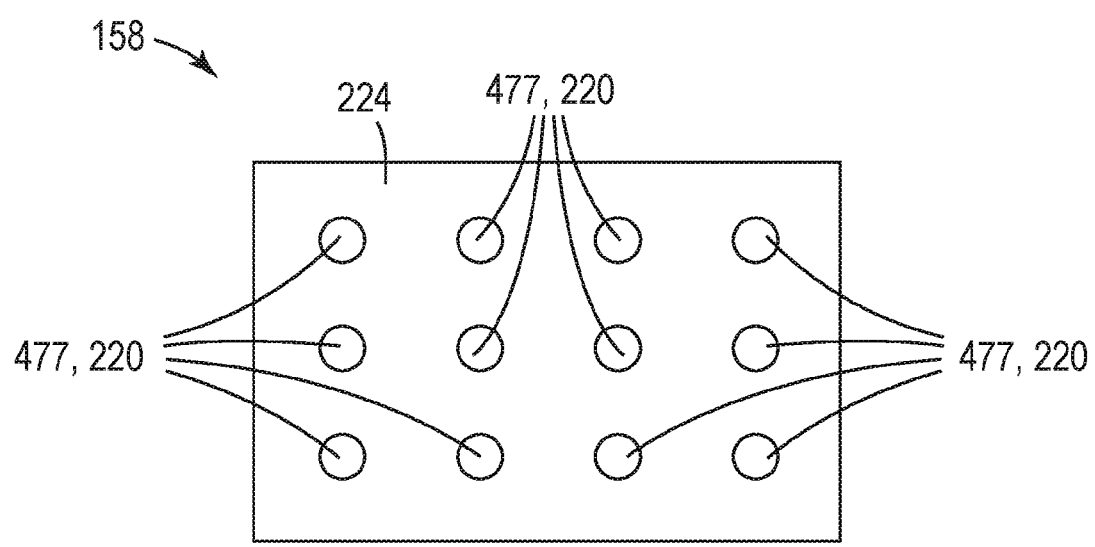
FIG. 13 illustrates another spatially-variant optical filter according to exemplary embodiments of the present disclosure.

In some embodiments, as best shown in FIG. 13, the optical filter 158 can include a plurality of apertures, holes or open areas 477. The apertures 477 can form a spatially-variant pattern. Portions of the optical filter 158 not defined by the apertures 477 can include the first and/or second filter sheets 190, 194. Further, the apertures 477 can form the first areas 220, second areas 224, third areas 228 and/or fourth areas 232, while others of the first areas 220, second areas 224, third areas 228 and fourth areas 232 can be formed from portions of the optical filter 158 outside of the apertures 477. Additionally, downconverters 400, 500, as exemplified in FIGS. 10 and 11, can be included in portions of the optical filter 158 outside of the apertures 477.

All references, patents, and patent applications referenced in the foregoing are hereby incorporated herein by reference in their entirety in a consistent manner. In the event of inconsistencies or contradictions between portions of the incorporated references and this application, the information in the preceding description shall control. Although specific embodiments have been illustrated and described herein, it will be appreciated by those of ordinary skill in the art that a variety of alternate and/or equivalent embodiments can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical system, comprising:
    an optical sensor;
    a plurality of photosensitive pixels disposed on the optical sensor;
    a wavelength-selective optical filter in optical communication with the photosensitive pixels, the wavelength-selective optical filter being disposed remotely from the optical sensor; and
    a plurality of spatially-variant areas disposed in the optical filter, at least one area of the plurality of spatially-variant areas including a downconverter,
    wherein the wavelength-selective optical filter comprises first and second filter sheets, the first filter sheet defining therein at least one first written region and at least one first non-written region, the second filter sheet defining therein at least one second written region and at least one second non-written region, the plurality of spatially-variant areas comprising:
    an area of the at least one first written region overlapping with an area of the at least one second non-written region;
    an area of the at least one first non-written region overlapping with an area of the at least one second written region; and
    an area of the at least one first written region overlapping with an area of the at least one second written region.

2. The optical system of claim 1, further including a high-pass filter disposed at an output side of the downconverter.

3. The optical system of claim 1, further including a low-pass filter disposed at an input side of the downconverter.

4. The optical system of claim 1, further including a reflector, the wavelength-selective optical filter and a measurement subject each being disposed between the reflector and the optical sensor along an optical path.

5. The optical system of claim 1, further including a light source and a reflector, wherein the wavelength-selective optical filter and a measurement subject are each disposed between the light source and the reflector along an optical path.

6. The optical system of claim 1, further including a light source, wherein the wavelength-selective optical filter and a measurement subject are each disposed between the light source and the optical sensor along an optical path.

7. The optical system of claim 1, wherein the wavelength-selective optical filter is disposed between the optical sensor and a measurement subject along an optical path.

8. The optical system of claim 1, wherein a measurement subject is disposed between the wavelength-selective optical filter and the optical sensor along an optical path.

9. An optical device, comprising:
    an optical sensor;

a plurality of photosensitive pixels disposed on the optical sensor;
a wavelength-selective optical filter in optical communication with the photosensitive pixels;
a first plurality of spatially-variant areas disposed in the optical filter;
a second plurality of spatially-variant areas disposed in the optical filter; and
a third plurality of spatially-variant areas disposed in the optical filter,
wherein the wavelength-selective optical filter comprises first and second filter sheets, the first filter sheet defining therein at least one first written region and at least one first non-written region, the second filter sheet defining therein at least one second written region and at least one second non-written region, wherein:
the first plurality of spatially-variant areas comprises an area of the at least one first written region overlapping with an area of the at least one second non-written region;
the second plurality of spatially-variant areas comprises an area of the at least one first non-written region overlapping with an area of the at least one second written region; and
the third plurality of spatially-variant areas comprises an area of the at least one first written region overlapping with an area of the at least one second written region, and
wherein at least one area of the first, second or third pluralities of spatially-variant areas includes a downconverter.

10. The optical device of claim 9, further including a high-pass filter disposed at an output side of the downconverter.

11. The optical device of claim 9, further including a low-pass filter disposed at an input side of the downconverter.

12. The optical device of claim 9, wherein the wavelength-selective optical filter includes a reference area.

13. The optical device of claim 9, wherein the wavelength-selective optical filter is flexible.

14. The optical device of claim 9, wherein a size of at least one area of the first plurality of spatially-variant areas is different from a size of at least one area of the second plurality of spatially-variant areas.

15. An optical device, comprising:
a wavelength-selective optical filter, the filter including:
a first plurality of spatially-variant areas disposed in the optical filter, at least one area of the first plurality of spatially-variant areas including a downconverter; and
a second plurality of spatially-variant areas disposed in the optical filter; and
a third plurality of spatially-variant areas disposed in the optical filter,
wherein the wavelength-selective optical filter comprises first and second filter sheets, the first filter sheet defining therein at least one first written region and at least one first non-written region, the second filter sheet defining therein at least one second written region and at least one second non-written region, and wherein:
the first plurality of spatially-variant areas comprises an area of the at least one first written region overlapping with an area of the at least one second non-written region;
the second plurality of spatially-variant areas comprises an area of the at least one first non-written region overlapping with an area of the at least one second written region; and
the third plurality of spatially-variant areas comprises an area of the at least one first written region overlapping with an area of the at least one second written region.

* * * * *